United States Patent [19]

Hallock

[11] 3,786,490

[45] Jan. 15, 1974

[54] REVERSIBLE 2'S COMPLEMENT TO SIGN-MAGNITUDE CONVERTER

[75] Inventor: Robert Warren Hallock, Point Pleasant, N.J.

[73] Assignee: Bell Telephone Laboratories Incorporated, Murray Hill, N.J.

[22] Filed: Apr. 20, 1972

[21] Appl. No.: 245,944

[52] U.S. Cl. .................... 340/347 DD, 235/92 CM
[51] Int. Cl. .................... H04l 3/00
[58] Field of Search .................... 340/347 DD; 235/92 CM, 92 EV

[56] References Cited

UNITED STATES PATENTS

| | | | |
|---|---|---|---|
| 3,373,421 | 3/1968 | Wang | 340/347 DD |
| 3,576,973 | 5/1971 | Draper | 235/92 EV |
| 3,652,841 | 3/1972 | Lanning | 340/347 DD |
| 3,588,461 | 6/1971 | Halsall | 340/347 DD |

OTHER PUBLICATIONS

IBM Technical Disclosure Bulletin, Elliott et al., "Two's Complement or Straight Through Logic Arrangement," Vol. 12, No. 11, 4/1970, p. 1978,1979.
Chu, "Digital Computer Design Fundamentals," 1962, p. 10,11,366–368.

*Primary Examiner*—Thomas J. Sloyan
*Attorney*—W. L. Keefauver et al.

[57] ABSTRACT

Two tandem-connected stages of EXCLUSIVE OR circuits transmit numerical digits of a signed multidigit binary signal representation. In the first stage a sign digit signal is EXCLUSIVE ORed with the numerical digits to drive the second stage circuits. In addition, the sign digit is ORed with the numerical digits to produce an enabling signal which is cooperatively employed with the sign digit and a control signal, indicating direction of conversion, for controlling the state of the output sign digit and for controlling the operation of the second stage of EXCLUSIVE OR circuits in regard to conversion algorithm deviations required for certain zero character and overflow character signal representations.

8 Claims, 1 Drawing Figure

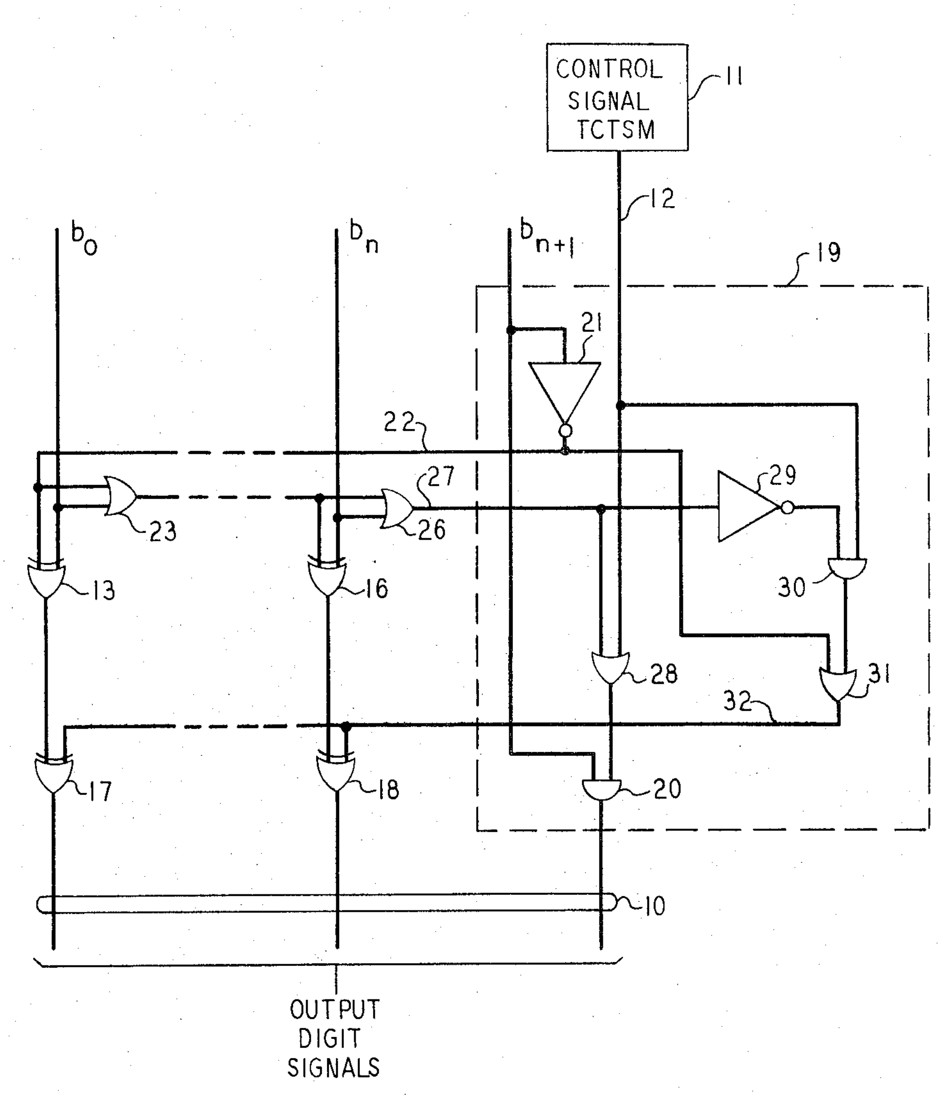
CONTROL SIGNAL TCTSM
11
12
$b_0$
$b_n$
$b_{n+1}$
19
21
22
27
29
23
26
13
16
30
28
31
32
17
18
20
10
OUTPUT DIGIT SIGNALS

REVERSIBLE 2'S COMPLEMENT TO SIGN-MAGNITUDE CONVERTER

BACKGROUND OF THE INVENTION

1. Field of the Invention

This invention relates to signal complementers; and it relates, in particular, to a reversible, parallel complementer for converting in either direction between sign-magnitude and 2's complement signal representations.

2. Description of the Prior Art

In semiconductor integrated circuit systems it is desirable to employ a few different types of circuit chips as possible. In such systems it is also often necessary to make conversions in one direction or the other between binary sign-magnitude representations of numbers and binary 2's complement representations of the same numbers. Certain arithmetic operations that are basic to more complex digital functions utilize 2's complement representations, but other associated system functions operate more advantageously in the sign-magnitude mode.

Sign-magnitude number representations include the different characters 0,000 . . . 0 and 1,000 . . . 0 for positive zero and negative zero, respectively. The 2's complement mode of signal representation includes only the former zero representation, and the sign-magnitude negative zero representation is the same as one less than negative full scale in 2's complement representation, i.e., the negative overflow condition in 2's complement representation. Overflow is a condition that must be readily recognized and specially dealt with in digital computation systems.

Thus, when converting sign-magnitude representations to 2's complement representations, it is necessary to force any input negative zero character to the single possible output zero character. The term "force" is here utilized to indicate a conversion by a way that does not conform to the usual conversion algorithm otherwise employed. Similarly, when converting 2's complement representations to sign-magnitude representations, it is necessary to force any input negative overflow character, i.e., 1,000 . . . 0, to the corresponding output overflow character, i.e., 1,111 . . . 1, rather than converting to the output negative zero character 1,000 . . . 0 which would otherwise result.

Prior art parallel complementers usually perform the necessary conversion on numerical digits of an input binary representation by complementing those digits and then adding a binary ONE in the least significant bit position. Nothing is done with respect to the sign bit. If the aforementioned special cases involving negative zero and overflow should be of interest in a particular system, separate special logic is provided to deal with those cases.

In comparatively slow systems, complementations are often handled advantageously by an appropriate program in a general purpose programmed arithmetic unit. In faster systems, however, such as those employing time-shared digital filters, the program technique is too slow and dedicated wired logic is required. In constructing such logic the need for minimizing the number of integrated circuit chip types becomes substantial. Although the usual mode conversion hardware techniques are reversible as to the numerical digits of most binary representations, they are not reversible as to the special conversion cases involving zero and overflow characters. Consequently, different circuit chips are required for the different conversion directions between sign-magnitude and 2's complement representations.

SUMMARY OF THE INVENTION

The aforementioned difficulties of the prior art are met, in accordance with one aspect of the present invention, by transmitting a multidigit binary signal representation, including numerical digits and sign digits, through successive selective inverting stages. In the first stage the inversion depends upon the factors of binary signal state of the input sign digit and the binary signal states of the respective input numerical digits. Those same two factors are also employed to produce an enabling signal for further cooperating with a control signal, indicating a certain direction of conversion, for controlling inversion in the second stage for all numerical digit signals received from the first stage, and for controlling the signal state of the complementer output sign digit signal.

BRIEF DESCRIPTION OF THE DRAWING

A more complete understanding of the invention may be obtained from the following detailed description when considered in connection with the appended claims and the single FIGURE of the attached drawing, containing a schematic diagram of a reversible complementer in accordance with the present invention.

DETAILED DESCRIPTION

Multidigit ordered binary signals are provided in bit parallel format from any suitable signal source (not shown) in either the 2's complement or the sign-magnitude mode of number representation. Any appropriate number of digits can be accommodated by the present invention; and in the drawing an input circuit $b_0$ is provided for the least significant bit position signal, and a similar circuit $b_n$ is provided for the signal in the most significant numerical bit position. In addition, a circuit $b_{n+1}$ is provided for a sign digit signal. These input signals are coupled through the circuits of the reversible complementer in the same signal paths regardless of the direction of conversion which is to be performed; and they appear in the converted form on corresponding output digit circuits 10.

A control signal source 11 provides a control signal TCTSM for indicating which direction of signal conversion is to be carried out. Thus, the appearance of a binary ONE, or a high voltage signal, on the source output circuit 12 indicates a conversion from 2's complement to sign-magnitude, and a low voltage binary ZERO signal indicates a conversion in the reverse direction. Although the source 11 is generally indicated by a box in the drawing, one of the aforementioned control signals may be provided by hard wiring from an appropriate voltage bus in accordance with the intended conversion direction. Similarly the control signal may be provided by a control sequencer, or by other program control, if the conversion is to be performed in different directions under different conditions, depending upon the nature of the system in which the reversible complementer is employed.

The complementer of the present invention includes a first selective inverting stage comprising a set of EXCLUSIVE OR gates, such as the gates 13 and 16 in the drawing. Each gate is provided at one input thereof with a connection to a different one of the numerical digit signal input circuits, such as the circuits $b_0$ and $b_n$ respectively. A second selective inverting stage is also provided in tandem with the first stage, and includes another set of EXCLUSIVE OR gates such as the gates 17 and 18 in the drawing. Each of the gates in the second set has an input connection from the output of a first stage EXCLUSIVE OR gate in the corresponding digit position. Thus, the output of gate 13 is coupled to an input of gate 17 and the output of gate 16 is coupled to an input of the gate 18. Outputs of EXCLUSIVE OR gates in the second set are connected to the digit output signal circuits 10 of the complementer.

Control of the inversion selection is accomplished by an inversion control circuit 19 which includes a through coupling signal path for the sign digit circuit $b_{n+1}$ by way of an AND gate 20. The sign digit signal thus provides partial control of the latter gate.

A signal inverting gate 21 couples the input sign digit signal in inverted form to a circuit 22 which extends to a second input connection on the EXCLUSIVE OR gate 13. The same inverted sign digit signal is also coupled through a succession of OR gates, such as the gates 23 and 26 in the drawing, to inputs of each of the other EXCLUSIVE OR gates in the first set and to an enabling signal circuit 27. Each of the OR gates also has a further input connection from a numerical digit input circuit from the digit position in the next lower order of significance.

If the input sign digit signal on circuit $b_{n+1}$ is a binary ZERO, indicating a positive number, it appears on the circuit 22 as a binary ONE and causes the first set of EXCLUSIVE OR gates to invert all of the numerical digits of the input signal representation. On the other hand if the input sign digit is a binary ONE, indicating a negative number, the inverted low voltage form thereof on circuit 22 does not cause such an automatic inversion. However, if an input numerical digit signal is in the binary ONE state, it is cross-coupled through the aforementioned OR gates, such as gates 23 and 26, to inputs of EXCLUSIVE OR gates in all higher order numerical digit positions to cause digit signal inversion there. It will thus be appreciated that the output of the OR gate 26 from the highest order numerical digit signal position applies to the enabling circuit 27 a low voltage binary ZERO signal when the input sign digit signal is a binary ONE and all input numerical digit signals are in the binary ZERO state. Thus, the enabling signal is in the low voltage condition for both the sign-magnitude negative zero character (1,000 . . . 0) and the 2's complement negative overflow character; otherwise, the enabling signal is in the high voltage binary ONE signal condition.

The enabling signal on circuit 27 is ORed with the TCTSM control signal in an OR gate 28. The output of the latter gate is applied to a second input on the AND gate 20 for cooperating with the input sign digit signal on circuit $b_{n+1}$ to determine the output sign digit of the complementer. This arrangement allows the sign digit to be coupled through the complementer unchanged except when the sign-magnitude negative zero character is present in the input. In the latter case the sign digit signal is forced to the binary ZERO state because the 2's complement system of number representation has a single zero character, namely, 0,000 . . . 0. Since the input sign digit is in the binary ONE state for the sign-magnitude negative zero character, the AND gate 20 is partially enabled. Under those conditions, the enabling signal 27 is low, and the sign-magnitude negative zero possibility is indicated. However, as long as the TCTSM control signal is low, it is known that the input to the complementer is in the sign-magnitude format, and only a low voltage signal is applied by the OR circuit 28 to the AND gate 20. Consequently, the latter gate is not actuated, and the output sign digit signal is forced to be in the low voltage condition as required for representing the sign digit in the 2's complement zero character.

The enabling signal on circuit 27 is inverted in the inversion control circuit 19 by an inverting gate 29 and applied to one input of an AND gate 30. Another input of the same AND gate receives from the circuit 12 the output of control signal source 11. The output of AND gate 30 is coupled through an OR gate 31 to a circuit 32 which is connected to an input of each of the second stage EXCLUSIVE OR gates, such as gates 17 and 18. If the control signal TCTSM is high at the same time that the inverted enabling signal from circuit 27 is high, as is the case for the 2's complement negative overflow character, the resulting high voltage inversion control signal output of gate 30 forces the second set of EXCLUSIVE OR gates to invert numerical digit signals received from the first set of EXCLUSIVE OR gates. Since these conditions necessarily require that the input sign digit signal must have been in the binary ONE state, gate 20 is actuated and the sign digit signal in the complementer output is also high. Thus, the total output signal character from the complementer corresponds to the sign-magnitude negative overflow character 1,111 . . . 1. Similarly, if the input sign digit signal had been a binary ZERO, th inverted form thereof coupled through OR gate 31 also makes the inversion control signal on circuit 32 high and causes the second stage of EXCLUSIVE OR gates to invert the numerical digit signals received from the first stage. Since that same inverted binary ZERO sign digit signal also forces the first stage EXCLUSIVE OR gates to invert the input numerical signals, a duplicate inversion results so that there is no net change in the numerical digit signals.

Summarizing, the complementer of the present invention allows conversion in either direction as dictated by a control signal, between sign-magnitude and 2's complement forms of binary number representation. The unidirectional special cases are handled by the same circuits under the control of the same control signal, and the information content of the signals being converted. Furthermore, the numerical and sign digit signals are transmitted through the complementer in the same signal paths for either direction of conversion.

Although the present invention has been described in connection with a particular embodiment thereof, it is to be understood that additional embodiments, modifications, and applications thereof which will be obvious to those skilled in the art are included within the spirit and scope of the invention.

What is claimed is:

1. In combination, means for providing a two's complement to sign magnitude control signal, means for carrying out an EXCLUSIVE OR logic operation between input numerical digits of a signed binary coded signal representation and an inverted sign digit signal of said input representation, means for producing an inversion control signal in response to either a. a first predetermined signal state of said sign digit signal, or b. a simultaneous occurrence of a second state of said sign digit signal, a first state of all of said numerical digit signals, and a second state of said two's complement to sign magnitude control signal, means for inverting outputs of said EXCLUSIVE OR means in response to said inversion control signal, whereby the first produced inversion control signal reversibly controls conversions between positive sign magnitude and positive two's complement signal representations whereas the second produced inversion control signal controls conversion of a negative overflow character in two's complement signal representation to a negative overflow character in sign magnitude signal representation, and means for coupling said sign digit signal to an output with said inverting means output and including means, responsive to said first state of all of said numerical digits and a first state of said two's complement to sign magnitude control signal, for forcing said sign digit signal to said first state thereof whereby a negative zero character in sign magnitude signal representation is converted to a zero character in two's complement signal representation.

2. In combination means for providing a two's complement to sign magnitude binary control signal, means for carrying out an EXCLUSIVE OR logic operation between input numerical digits of a signed binary coded signal representation and an inverted sign digit signal of said input representation, means for producing an inversion control signal in response to either a. a first predetermined signal state of said sign digit signal, or b. a simultaneous occurrence of a second state of said sign digit signal and a first state of all of said numerical digit signals, means for inverting outputs of said EXCLUSIVE OR means in response to said inversion control signal, means for coupling said sign digit signal to an output with said inverting means output and including means, responsive to said first state of all of said numerical digits, for forcing said sign digit signal to aid first state, and means responsive to a first state of said two's complement to sign magnitude control signal for disabling operation of said producing means in response to said simultaneous occurrence whereby said signed binary coded signal is converted from a sign magnitude to a two's complement signal representation, and said means being further responsive to a second state of said two's complement to sign magnitude control signal for disabling said forcing means and enabling said producing means whereby said signed binary coded signal is converted from a two's complement to a sign magnitude signal representation.

3. In combination, a first pluarlity of EXCLUSIVE OR gates, one for each numerical digit of a signed, ordered, binary signal representation, means for applying each of said numerical digits to a first input of a different one of said gates, means for applying a sign digit signal of said representation, in inverted form, to a second output of the lowest ordered one of said gates, means for coupling to a second input of each of said gates, except said one gate, either said sign digit signal or the signals from any lower ordered gate first input, a second plurality of EXCLUSIVE OR gates, equal in number to said first plurality and each having an input connected to receive an output of a different one of said first plurality of gates, and means, responsive to a predetermined function of said sign digit signal, a two's complement to sign magnitude control signal, and said numerical digit signals, for controlling said second pluarlity of gates for selectably inverting outputs of said first plurality of gates in accordance with said function whereby said signed, ordered, binary signal representation is reversibly converted between sign magnitude and two's complement signal representations.

4. In combination, means for providing a two's complement to sign magnitude control signal, first and second stages of ordered multibit EXCLUSIVE OR logic for transmitting numerical digit signals of binary coded signal representations that also include a sign digit position signal, means for coupling said stages in tandem, means for controlling said first stage to invert all of said numerical digit signals if said sign signal is in a first signal state or, if said sign signal is in a second signal state, to invert any of said numerical digit signals in numerical digit positions of higher order than one of such numerical signals in a second signal state, means for controlling said second stage to invert all of said numerical digit signals from said first stage if said sign digit is in said first state, whereby reversible conversions are effected between positive two's complement and sign magnitude signal representations, or if all of said numerical signal digits are in said first state when said sign digit is in said second state and said two's complement to sign magnitude control signal is in a second state, whereby a negative overflow character in two's complement signal representation is converted to a negative overflow character in sign magnitude signal representation, and means for inverting said sign digit signal when all of said numerical signal digits are in said first state, said sign digit is in said second state, and said two's complement to sign magnitude control signal is in a first state whereby a negative zero character in sign magnitude signal representation is converted to a zero character in two's complement signal representation.

5. In combination, means for providing a two's complement to sign magnitude control signal, means, responsive to multiple ordered binary signal bits including numerical bits and a sign bit, for detecting coincidence of a second signal state in said sign bit and a first signal state in all of said numerical bits with said coincidence condition representing either negative zero in sign magnitude representation or negative overflow in two's complement representation, respectively, said detecting means providing an enabling signal in response to said coincidence, means for receiving said two's complement to sign magnitude control signal, and means, responsive to said enabling signal and a first state of said two's complement to sign magnitude control signal, for forcing said sign bit to a first state and leaving said numerical bits in said first state whereby negative zero in sign magnitude representation is converted to its equivalent two's complement representation, with said forcing means in response to a second signal state of said two's complement to sign magnitude control signal forcing said numerical bits to said second state and leaving said sign bit in said second state whereby negative overflow in two's complement representation is converted to the most negative quantity in sign magnitude representation.

6. In combination, means for providing a two's complement to sign magnitude control signal, means for carrying out a series of OR logic operations between input numerical digit or an ordered binary coded signal and a succession of OR logic input signals to produce an enabling signal, with the first input signal in said succession being an inverted sign digit signal of said ordered binary coded signal and each succeeding stage in said series deriving one of its inputs from a directly preceding stage, with said numerical digit signals being applied to said series in progressive order from a least significant digit to a more significant digit, means for carrying out an EXCLUSIVE OR logic operation between each of said numerical digits of said ordered binary coded signal and each of said OR logic input signals, means for producing an inversion control signal in response to said enabling signal, said inverted sign digit signal, and said two's complement to sign magnitude control signal, means for inverting outputs of said EXCLUSIVE OR means in response to said inversion control signal, whereby reversible conversions are effected between sign magnitude and two's complement signal representations, and means, responsive to said enabling signal and to said two's complement to sign magnitude control signal, for forcing said sign digit signal to a predetermined state.

7. The combination in accordance with claim 6 in which the means for producing the inversion control signal includes means responsive to said inverted sign digit signal for enabling said producing means when said sign digit signal is in a first signal state.

8. The combination in accordance with claim 6 in which the means for producing the inversion control signal includes means for inverting said signal resulting from said series of OR logic operations when all of said numerical digits of said ordered binary coded signal are in a first signal state and said sign digit signal is in a second signal state, means, responsive to said inverted signal and to a second signal state of said two's complement-sign magnitude control signal, for generating an enabling signal for said producing means.

* * * * *